United States Patent
Nishiguchi et al.

(10) Patent No.: US 10,161,101 B2
(45) Date of Patent: Dec. 25, 2018

(54) CONSTRUCTION MACHINE

(71) Applicant: Hitachi Construction Machinery Co., Ltd., Taito-ku, Tokyo (JP)

(72) Inventors: Hitoshi Nishiguchi, Tsuchiura (JP); Toshihiro Abe, Ushiku (JP); Tetsuya Matsumoto, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 5 days.

(21) Appl. No.: 15/506,778

(22) PCT Filed: Aug. 31, 2015

(86) PCT No.: PCT/JP2015/074808
§ 371 (c)(1),
(2) Date: Feb. 27, 2017

(87) PCT Pub. No.: WO2016/084448
PCT Pub. Date: Jun. 2, 2016

(65) Prior Publication Data
US 2017/0275846 A1    Sep. 28, 2017

(30) Foreign Application Priority Data
Nov. 28, 2014    (JP) .................................. 2014-242422

(51) Int. Cl.
*B60K 11/04*    (2006.01)
*E02F 3/32*    (2006.01)
(Continued)

(52) U.S. Cl.
CPC ................ *E02F 3/32* (2013.01); *B60K 11/04* (2013.01); *B60K 11/08* (2013.01); *B62D 25/10* (2013.01);
(Continued)

(58) Field of Classification Search
CPC ......... B60K 11/02; B60K 11/04; B60K 11/06; B60K 11/084; F01P 11/029
See application file for complete search history.

(56) References Cited

U.S. PATENT DOCUMENTS 3,820,593 A * 6/1974 Pabst ...................... F01P 11/02
123/41.54
4,790,369 A * 12/1988 Avrea ................... F01P 11/0238
123/41.51
(Continued)

FOREIGN PATENT DOCUMENTS

| JP | 11-190046 A | 7/1999 |
| JP | 2005-106040 A | 4/2005 |
| JP | 2013-24200 A | 2/2013 |

OTHER PUBLICATIONS

Machine translation of JPH11190046 reference, published Jul. 1999. Translation retrieved Apr. 27, 2018.*
(Continued)

*Primary Examiner* — Emma K Frick
(74) *Attorney, Agent, or Firm* — Crowell & Moring LLP

(57) ABSTRACT

A construction machine includes a cooling fan (10) and a shroud (11). The cooling fan (10) sends air drawn in via a radiator (30) to an engine. The shroud (11) is disposed on an outer peripheral side of the cooling fan and forms a passage for air to be drawn in via the radiator. The construction machine includes a tank (12) and a cover (14B). The tank (12) is disposed superior to an upper end portion of the radiator and stores cooling water to be supplied to the radiator and the engine. The cover (14B) is disposed openably in an opening (14A) formed in a top surface plate (11B) of the shroud. The tank (12) is disposed at a position adjacent to the shroud (11) on a side closer to the engine side than the cover (14B) is.

2 Claims, 6 Drawing Sheets

(51) Int. Cl.

| | | |
|---|---|---|
| *B62D 25/10* | (2006.01) | |
| *E02F 9/00* | (2006.01) | |
| *F01P 3/20* | (2006.01) | |
| *F01P 11/10* | (2006.01) | |
| *B60K 11/08* | (2006.01) | |
| *E02F 9/08* | (2006.01) | |
| *F01P 1/06* | (2006.01) | |
| *F01P 5/02* | (2006.01) | |
| *F01P 11/04* | (2006.01) | |

(52) U.S. Cl.
CPC .............. *E02F 9/00* (2013.01); *E02F 9/0866* (2013.01); *E02F 9/0875* (2013.01); *E02F 9/0883* (2013.01); *F01P 1/06* (2013.01); *F01P 3/20* (2013.01); *F01P 5/02* (2013.01); *F01P 11/04* (2013.01); *F01P 11/10* (2013.01); *B60Y 2200/412* (2013.01)

(56) References Cited

U.S. PATENT DOCUMENTS

| | | | | |
|---|---|---|---|---|
| 6,189,492 | B1* | 2/2001 | Brown | B60S 1/50 |
| | | | | 123/41.49 |
| 6,427,766 | B2* | 8/2002 | Zobel | F01P 11/029 |
| | | | | 123/41.49 |
| 6,523,507 | B2* | 2/2003 | Schmitz | F01P 11/029 |
| | | | | 123/195 A |
| 6,557,627 | B2* | 5/2003 | Moltzheim | B29C 49/20 |
| | | | | 123/41.49 |
| 6,997,239 | B2* | 2/2006 | Kato | F01P 5/06 |
| | | | | 123/195 A |
| 7,631,619 | B2* | 12/2009 | Bangert | F01P 11/028 |
| | | | | 123/41.54 |
| 8,646,555 | B2* | 2/2014 | Reed | F01P 11/029 |
| | | | | 180/68.4 |
| 9,016,415 | B2* | 4/2015 | Kobayashi | B60K 11/02 |
| | | | | 123/41.27 |
| 9,150,095 | B2* | 10/2015 | Matano | B60K 11/04 |
| 9,266,422 | B2* | 2/2016 | Narita | B60K 5/1208 |
| 2007/0044938 | A1* | 3/2007 | Farley | B60K 11/02 |
| | | | | 165/41 |
| 2015/0345365 | A1* | 12/2015 | Wikstrom | F01P 11/029 |
| | | | | 123/41.44 |
| 2016/0109191 | A1* | 4/2016 | Skrzyniarz | F28F 9/001 |
| | | | | 165/47 |
| 2016/0146093 | A1* | 5/2016 | Takahashi | F01P 11/029 |
| | | | | 165/104.32 |
| 2016/0369478 | A1* | 12/2016 | Kokuryou | E02F 3/325 |

OTHER PUBLICATIONS

Machine translation of JP2005106040 reference, published Apr. 2005. Translation retrieved Apr. 27, 2018.*
International Search Report (PCT/ISA/210) issued in PCT Application No. PCT/JP2015/074808 dated Oct. 13, 2015 with English translation (3 pages).
Japanese-language Written Opinion (PCT/ISA/237) issued in PCT Application No. PCT/JP2015/074808 dated Oct. 13, 2015 (4 pages).
International Preliminary Report on Patentability (PCT/IB/338 & PCT/IB/373) issued in PCT Application No. PCT/JP2015/074808 dated Jun. 8, 2017, including English translation of document C2 (Japanese-language Written Opinion (PCT/ISA/237)) previously filed on Feb. 27, 2017 (seven pages).

* cited by examiner

CONSTRUCTION MACHINE

TECHNICAL FIELD

The present invention relates to a construction machine including a tank that can store cooling water for an engine.

BACKGROUND ART

One known technique, for example, pertaining to the present invention is disclosed in Patent Document 1. The patent document discloses a hydraulic excavator including an upper swing structure that houses therein an engine, a cooling fan connected with the engine, and a radiator disposed anterior to the cooling fan. The hydraulic excavator further includes a reservoir tank for the radiator and the reservoir tank is disposed immediately above a shroud of the cooling fan. Additionally, the reservoir tank has a water filler port disposed at a level substantially identical to a water filler port of the radiator and the two water filler ports are connected with each other by a hose.

PRIOR ART DOCUMENT

Patent Document

Patent Document 1: JP-1999-190046-A

SUMMARY OF THE INVENTION

Problems to be Solved by the Invention

The engine cooling system disclosed in the above patent document includes an open-air type reservoir tank in which the cooling water is exchanged with the reservoir tank through a water filler port (water filler cap) disposed at an upper portion of an upper tank of the radiator, so that the reservoir tank is connected with only a hose for exchanging the cooling water with the radiator. Such a system has been required to have the reservoir tank disposed at a level equal to or lower than a height of the water filter cap of the radiator in order to prevent the cooling water from flowing out of the reservoir tank when the water filter cap of the radiator is open; however, the requirement has been relatively easily satisfiable because of a relatively ample space satisfying the requirement available inside the hydraulic excavator. A known hydraulic excavator, for example, includes a reservoir tank housed at a site that is accessible when a lateral surface of an upper swing structure having a cooling air intake port is open.

Meanwhile, in recent years, there has been a mounting need for bleeding not only the engine, but also an engine cooling water passage of air because more air tends to accumulate in the engine cooling water passage as a result of an increased length of the engine cooling water passage. Thus, a study has been started into use of a cooling system that includes an air bleeder conduit for removing air. The air bleeder conduit has one end connected with an engine cooling water passage and the other end connected with an air layer inside a closed type reservoir tank (also known as an expansion tank). The cooling system then performs gas liquid separation of the cooling water in the reservoir tank before feeding cooling water only back into the cooling water passage. In an engine cooling system including the air bleeder conduit of the foregoing type, the reservoir tank is required to be disposed at a position higher than a cooling water level in a cooling water passage disposed at the highest position among other cooling water passages that are configured in the radiator and the engine. In the upper swing structures of conventional hydraulic excavators, however, an engine cover very often exists immediately above the radiator and it is difficult to allocate in areas above the radiator a space in which the reservoir tank is to be housed. Having a wide base area (cross-sectional area) allows the height of the reservoir tank to be reduced to a low level; however, an excessively wide base area can disable supply of cooling water from the reservoir tank when the hydraulic excavator is operated on a slope. Thus, the reservoir tank needs to have a certain height.

Additionally, review of the engine cooling system calls for examination of not only new items as described above, but also items that have conventionally been unnecessary. Because of the air bleeder conduit connected with the upper portion of the upper tank of the radiator, for example, a need arises, instead of the conventional method for supplying cooling water to the upper tank, to allocate another cooling water supply route through which cooling water supply performance is not to be impaired. In addition, to select a site at which to dispose the reservoir tank, care should be used to obtain a space between the radiator and the cooling fan, into which a blower for cleaning the radiator can be inserted.

It is an object of the present invention to provide a construction machine that enables bleeding of air a cooling water passage disposed in a radiator and an engine.

Means for Solving the Problems

The present application includes a plurality of means for solving the above problems. In one aspect, the present application provides, for example, a construction machine that includes: an engine; a radiator that cools through heat exchange cooling water heated by the engine; a cooling fan disposed between the radiator and the engine, the cooling fan sending air drawn in via the radiator to the engine; and a shroud disposed on an outer peripheral side of the cooling fan, the shroud forming a passage for air to be drawn in via the radiator. The construction machine includes: a tank disposed superior to an upper end portion of the radiator, the tank storing cooling water to be supplied to the radiator and the engine; and a cover disposed openably in an opening formed in an upper surface of the shroud. In this construction machine, the tank is disposed at a position adjacent to the shroud, the position being on a side closer to the engine than the cover is.

Effect of the Invention

In one aspect of the present invention, air can be bled of a cooling water passage disposed in a radiator and an engine without allowing cooling water adding performance for an engine cooling system and cleaning performance of the radiator to be impaired.

MODES FOR CARRYING OUT THE INVENTION

An embodiment of the present invention is described below with reference to the accompanying drawings. The embodiment is described using a crawler type hydraulic excavator as an exemplary construction machine 1. The construction machine 1 is not limited to the crawler type hydraulic excavator and the present invention can be widely applicable to other types of construction machines, including a wheel type hydraulic excavator, a hydraulic crane, a wheel loader, and a tractor, having a configuration including an engine, a radiator, and a shroud for guiding air that has flowed past the radiator into an engine compartment by way of a cooling fan. In the following, a machine anterior-posterior direction of the hydraulic excavator 1 may be referred to simply as being "longitudinal," a machine crosswise direction may be referred to simply as being "lateral," and a machine superior-inferior direction may be referred to simply as being "vertical." For example, the term "front side," as used herein, denotes an anterior side in the machine anterior-posterior direction of the hydraulic excavator 1. Additionally, the term "adding water," as used herein, denotes a state or an operation in which the cooling water is added to the tank for replacement or replenishment of the cooling water, or work performed therefor. The term "supplying water," as used herein, denotes a state or an operation in which the cooling water in the tank is supplied into the cooling water passage, or work performed therefor.

Figure 1:
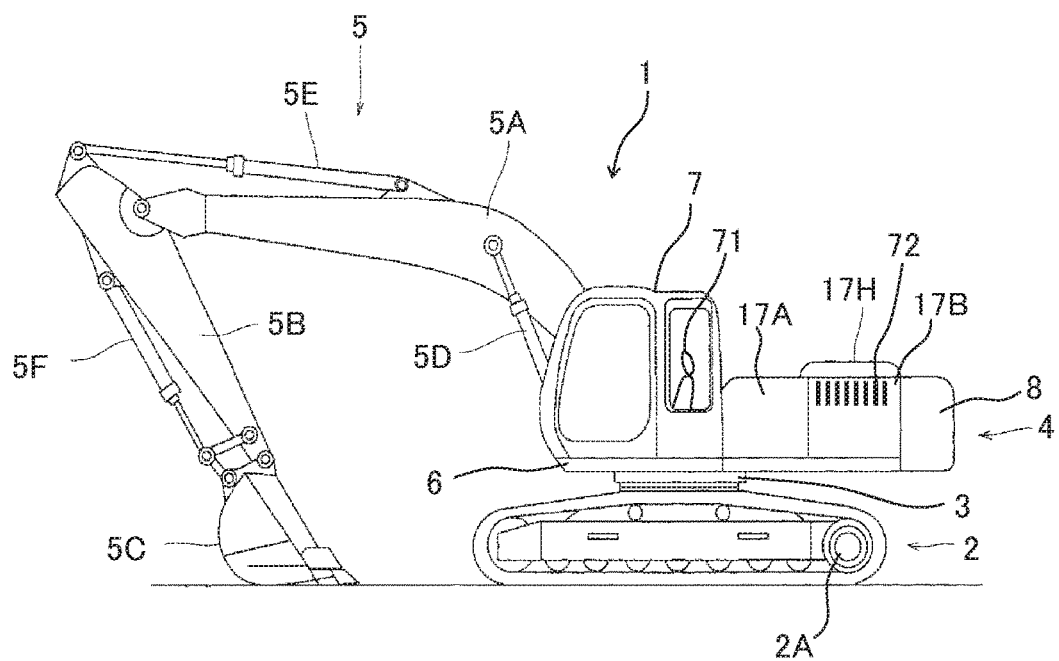
FIG. 1 is a side elevational view of a hydraulic excavator 1 according to an embodiment of the present invention.
Figure 2:
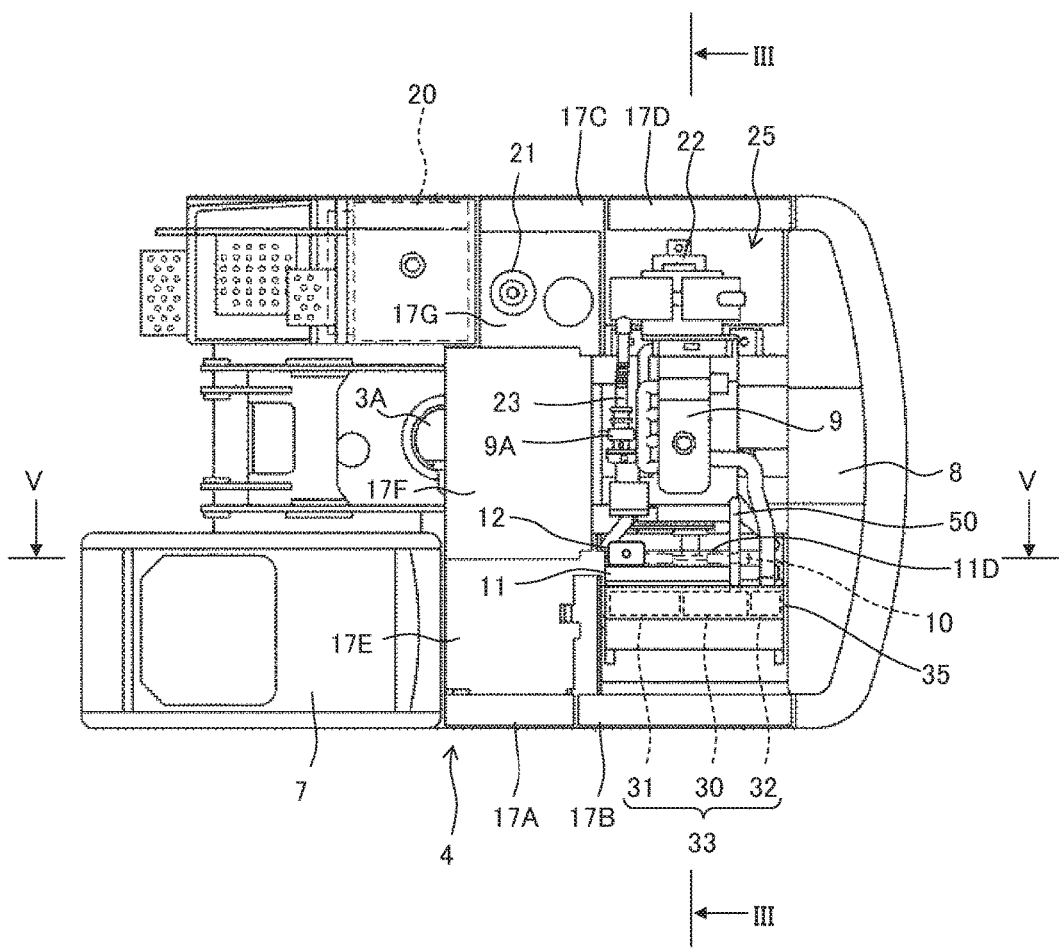
FIG. 2 is a top view of an upper swing structure 4 in the hydraulic excavator 1.

FIG. 1 is a side elevational view of the hydraulic excavator 1. FIG. 2 is a top view of an upper swing structure 4 in the hydraulic excavator 1 (note that a work implement 5 and an engine cover 17 are not shown). The crawler type hydraulic excavator 1 as the construction machine 1 mainly includes a lower track structure 2, the upper swing structure 4, and the work implement 5. Specifically, the lower track structure 2 is capable of self-propelling. The upper swing structure 4 is swingably mounted on the lower track structure 2 by a swing device 3. The work implement 5 is disposed at a front side of the upper swing structure 4 so as to be capable of being raised and lowered and performs, for example, an earth excavating operation. In the lower track structure 2, a track motor 2A drives crawlers that are mounted on outer peripheral portions of the lower track structure 2. The swing device 3 causes a swing motor 3A shown in FIG. 2 to be rotatably driven, to thereby swing the upper swing structure 4 with respect to the lower track structure 2.

The work implement 5 includes a boom 5A, an arm 5B, and a bucket 5C. Specifically, the boom 5A is mounted on the upper swing structure 4 so as to be capable of being raised and lowered. The arm 5B is mounted at a distal end portion of the boom 5A so as to be capable of being raised and lowered. The bucket 5C is mounted rotatably at a distal end of the arm 5B. The boom 5A is raised and lowered by a boom cylinder 5D. The arm 5B is rotated by an arm cylinder 5E. The bucket 5C is rotated by a bucket cylinder 5F. A control valve disposed in the upper swing structure 4 controls each of the track motor 2A of the lower track structure 2, the swing motor 3A of the swing device 3, and the hydraulic cylinders 5D, 5E, and 5F of the work implement 5.

A cab 7 is disposed at a front left side of a swing frame 6 that constitutes a lower portion of the upper swing structure 4. An operator seat 71, control levers for traveling (not shown), control levers for work (not shown), and the like are disposed inside the cab 7 in order for an operator to operate the hydraulic excavator 1. A counterweight 8 is mounted at a rear end portion of the swing frame 6. The counterweight 8 is intended to achieve a weight balance with the work implement 5 and has a rear surface curved and protruding.

Reference is made to FIG. 2. A machine room 25 is disposed on the rear side of the swing frame 6 and anterior to the counterweight 8. The machine room 25 houses an engine 9 that assumes a drive source for the hydraulic excavator 1. The engine 9 is disposed transversely in the lateral direction on the swing frame 6. A control valve 60 (see FIG. 5) is disposed anterior to the machine room 25 across a wall surface 19 (see FIG. 5).

A drive pulley (not shown) is mounted at an end portion of an output shaft of the engine 9. Rotation of the drive pulley is transmitted to a driven pulley via an endless belt (V belt (not shown)), causing a cooling fan 10 mounted on the driven pulley to rotate. It is noted that the drive source for the cooling fan 10 is not limited to the engine 9 that is mechanically coupled to the cooling fan 10. Another possible arrangement may include an electric motor or any other drive source that rotatably drives the cooling fan 10.

A hydraulic pump unit 22 including a plurality of hydraulic pumps is disposed on a side opposite to the side on which the cooling fan 10 is mounted on the engine 9, specifically, at a rear right side of the hydraulic excavator 1. A hydraulic operating fluid tank 21 and a fuel tank 20 are disposed in tandem with each other and anterior to the hydraulic pump unit. The hydraulic operating fluid tank 21 holds a hydraulic operating fluid for driving, for example, the lower track structure 2 and the work implement 5. The hydraulic pumps that constitute the hydraulic pump unit 22 deliver, as a hydraulic fluid, the hydraulic operating fluid in the hydraulic operating fluid tank 21 to respective hydraulic actuators. The hydraulic operating fluid that is returned from each of the hydraulic actuators is passed through an oil cooler 31 (to be described later) and can thus be cooled.

A supercharger 9A such as a turbocharger for boosting a flow rate of intake air is disposed at an upper portion and anterior to the engine 9 via an exhaust conduit 23. The engine 9 is supported on the swing frame 6 via a vibration-proof mount in a vibration-free state.

A heat exchange unit 33 is disposed on the left side relative to the engine 9. The heat exchange unit 33 includes a radiator 30, the oil cooler 31, and an intercooler 32. Specifically, the radiator 30 cools the engine cooling water. The oil cooler 31 cools the hydraulic operating fluid. The intercooler 32 cools air drawn in by the engine 9. Each of the radiator 30, the oil cooler 31, and the intercooler 32 is disposed to face the cooling fan 10. In the example shown in FIG. 2, the radiator 30, the oil cooler 31, and the intercooler 32 are disposed in sequence from the front side to the rear side. A heat exchanger cover 35 covers upper portions of the radiator 30, the oil cooler 31, and the intercooler 32.

The engine 9, the heat exchange unit 33, the hydraulic pump unit 22, for example, are disposed on the swing frame 6 in a space (machine room 25) extending laterally at the front side relative to the counterweight 8. Units including the engine 9, the heat exchange unit 33, the hydraulic pump unit 22, the hydraulic operating fluid tank 21, and the fuel tank 20 that are provided on the swing frame 6 are covered by a building cover 17 provided on the swing frame 6.

Figure 3:
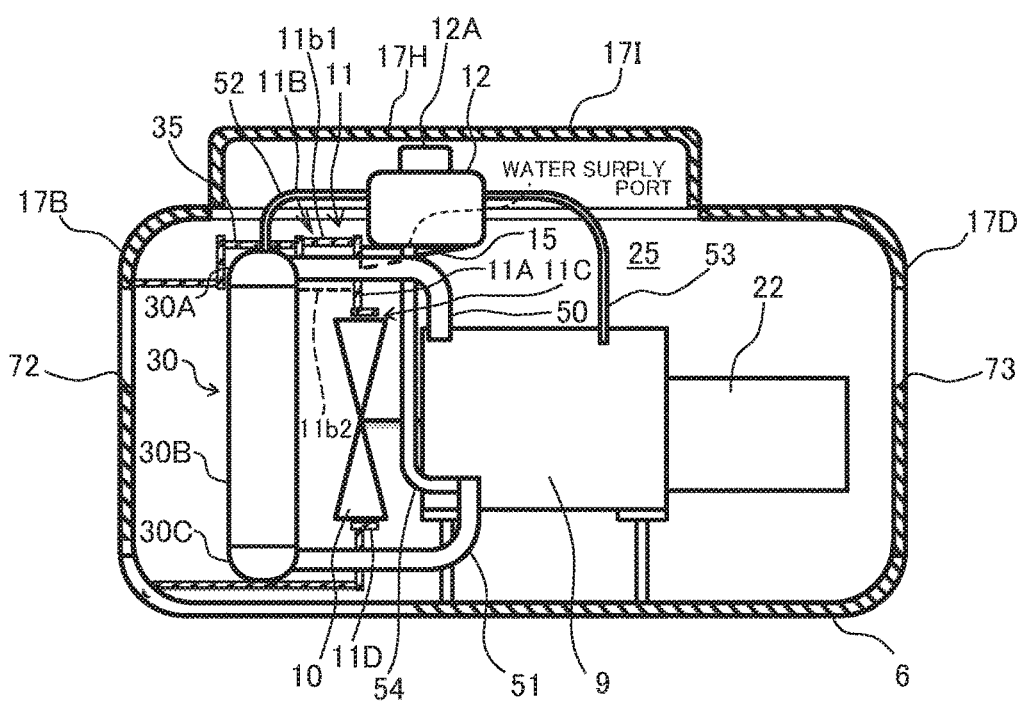
FIG. 3 is a sectional view schematically showing the upper swing structure 4 in a section taken along line III-III in FIG. 2.

The building cover 17 includes left side surface plates 17A and 17B, right side surface plates 17C and 17D, top surface plates 17E, 17F, and 17G, and engine covers 17H and 17I (see FIGS. 1 and 3). More specifically, the left side surface plates 17A and 17B are disposed on the left of the swing frame 6 and extend vertically. The right side surface plates 17C and 17D are disposed on the right of the swing frame 6 and extend vertically. The top surface plates 17E, 17F, and 17G extend horizontally across upper end portions of the left side surface plates 17A and 17B and the right side surface plates 17C and 17D. The engine covers 17H and 17I (see FIGS. 1 and 3) cover upper portions of the machine room 25 behind the top surface plates 17E, 17F, and 17G.

The left side surface plate 17B has an inflow port 72 (see FIGS. 1 and 3) formed of a plurality of vertically long slits for introducing air to be supplied to the heat exchange unit 30 as cooling air. The right side surface plate 17D has an outflow port 73 (see FIG. 3) formed of a plurality of vertically long slits for allowing air (cooling air) that has flowed past the engine 9 to be discharged to the outside.

Figure 5:
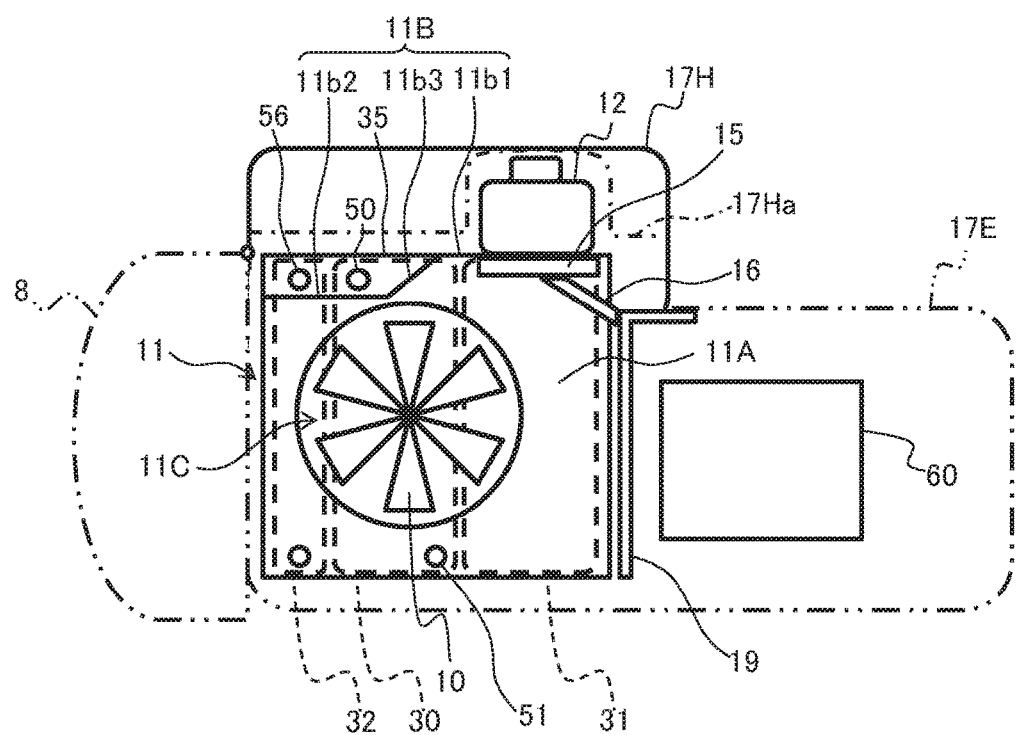
FIG. 5 is a sectional view schematically showing the upper swing structure 4 in a section taken along line V-V in FIG. 2.
Figure 6:
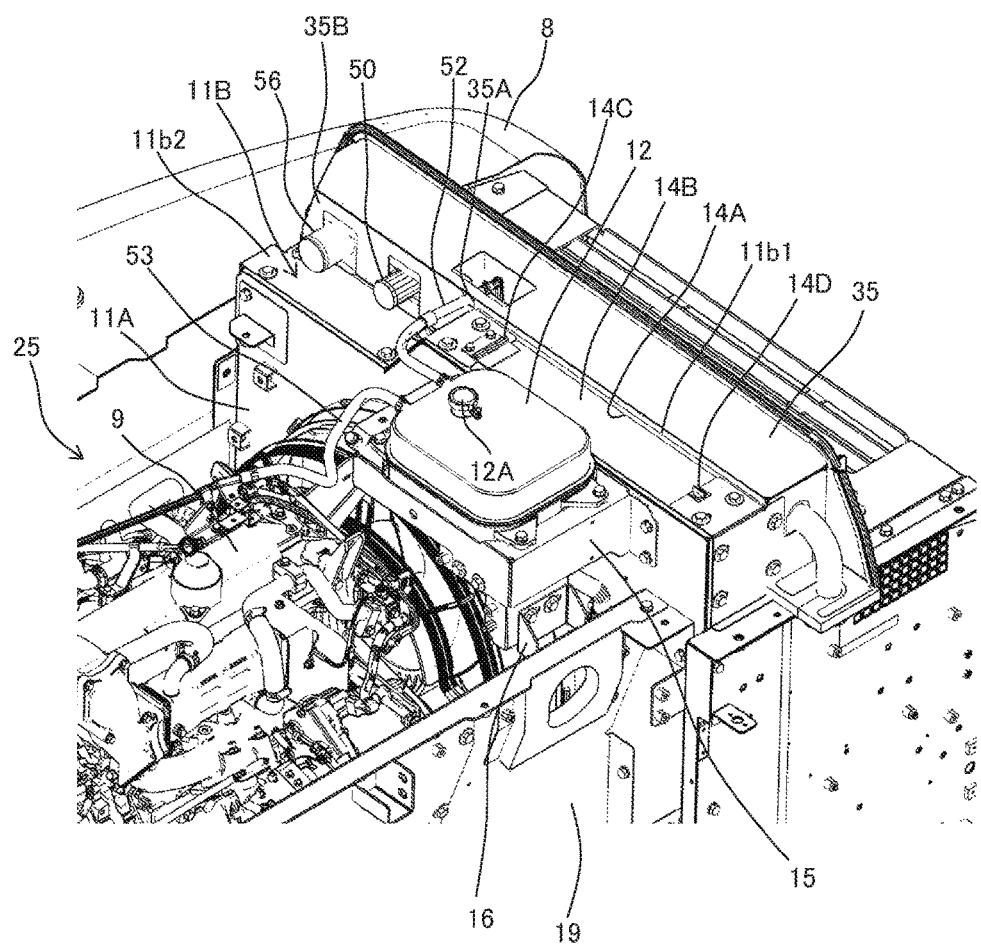
FIG. 6 is a detailed perspective view showing parts around a tank 12.

FIG. 3 is a sectional view schematically showing the upper swing structure 4 in a section taken along line III-III in FIG. 2. FIG. 5 is a sectional view schematically showing the upper swing structure 4 in a section taken along line V-V in FIG. 2. FIG. 6 is a detailed perspective view showing parts around a tank 12. It is noted that elements that are constructed identically to previously-discussed elements are assigned identical reference numerals and descriptions therefor may not be reiterated (the same holds for other drawings).

Reference is made to FIG. 3. The radiator 30, the cooling fan 10, and the engine 9 are disposed in sequence from left to right in the machine room 25. More specifically, the radiator 30 performs heat exchange between engine cooling water heated by the engine 9 and air (cooling air) to thereby cool the engine cooling water. The cooling fan 10 sends the air (cooling air) drawn in through the radiator 30 to the engine 9. The engine 9 is cooled through heat exchange with the engine cooling water that is circulated and supplied to a water jacket 93 (see FIG. 4).

A shroud 11 is disposed between the radiator 30 and the engine 9 inside the machine room 25. The shroud 11 is disposed on an outer peripheral side of the cooling fan 10 and forms a passage for air to be drawn in to the side of the engine 9 via the radiator 30. The shroud 11 includes a side surface plate 11A disposed on the engine side and having a substantially rectangular shape (note that the side surface plate 11A is not a precisely rectangular plate because of an upper end thereof extending further upwardly at a front side than at a rear side, as is described later).

The side surface plate 11A has a substantially circular opening 11C formed at a central portion thereof. An annular ring member 11D is fitted to an edge of the opening 11C in such a manner as to protrude toward the engine 9 side. The cooling fan 10 is fixed inside a substantially columnar space formed by the ring member 11D. It is noted that the position at which the cooling fan 10 is to be fixed is not limited to the inside of the ring member 11D. The cooling fan 10 may be fixed at any position that is deviated to the left or right in FIG. 3, when the cooling fan 10 at that deviated position can supply air in the shroud 11 to the engine 9 side.

The shroud 11 further includes a front-side surface plate and a rear-side surface plate. The front-side surface plate and the rear-side surface plate are disposed to be spaced apart from each other in the longitudinal direction. The front-side surface plate and the rear-side surface plate each extend vertically in the lateral direction. A top surface plate 11B is disposed across upper portions of the front-side surface plate and the rear-side surface plate. The top surface plate 11B includes an upper step portion 11b1, a lower step portion 11b2, and a connecting portion 11b3. More specifically, the upper step portion 11b1 is disposed at a height substantially equal to a height of an upper surface plate of the heat exchanger cover 35, and has a rectangular shape extending substantially horizontally in the longitudinal direction. The lower step portion 11b2 is disposed at a height lower than the upper step portion 11b1 and beneath a radiator upper hose 50 and an intercooler hose 56, and has a rectangular shape extending substantially horizontally in the longitudinal direction. The connecting portion 11b3 connects a rear end edge of the upper step portion 11b1 with a front end edge of the lower step portion 11b2, and has a rectangular slope surface inclined upwardly toward to the front. The upper step portion 11b1 is disposed anterior to the connecting portion 11b3 and the lower step portion 11b2 and at a position closest to the top surface plates 17E and 17F (cab 7) among the three portions of the top surface plate 11B.

To avoid the radiator upper hose 50 and the intercooler hose 56 that protrude from a side surface plate 35B (see FIG. 6) of the heat exchanger cover 35 on the engine side (shroud side), the lower step portion 11b2 is disposed at a height lower than lower ends of the radiator upper hose 50 and the intercooler hose 56.

The upper step portion 11b1 has a rectangular opening (shroud inspection window) 14A that extends over a length shorter than the upper step portion 11b1 in the longitudinal direction. The opening 14A is fitted with a rectangular inspection window cover (open/close cover) 14B that openably closes the opening 14A. In the present embodiment, the inspection window cover 14B is mounted via a hinge (hinge portion) 14C disposed at a rear end edge in the opening 14A in such a manner as to be capable of opening the opening 14A. The foregoing arrangement results in the inspection window cover 14B being supported rotatably with respect to the top surface plate 11B (shroud 11). Additionally, a fixing bracket 14D for fixing the inspection window cover 14B to the upper step portion 11b1 is disposed at a free end (front side end portion) of the inspection window cover 14B.

Opening the inspection window cover 14B exposes the opening 14A to the outside, enabling access to the inside of the shroud 11 by way of the opening 14A. A blower, for example, may be inserted from the opening 14A and air flowing in a direction opposite to air flow direction during engine cooling may be sent to the radiator 30. This can remove dirt and foreign matter attached to a radiator core 30B therefrom.

It is noted that the shape of the opening 14A and the method for fixing the inspection window cover 14B to the upper step portion 11b1 described above are illustrative only and not limited thereto. The opening 14A is required only to have a shape through which a blower or other cleaning tool can be inserted into the inside of the shroud 11. The method for fixing the inspection window cover 14B is required only such that the inspection window cover 14B can be removed from the opening 14A.

The side surface plate 11A of the shroud 11 in the present embodiment has an upper end shaped to match a shape of the top surface plate 11B (specifically, shapes of the upper step portion 11b1, the lower step portion 11b2, and the connecting portion 11b3). This arrangement results in a shoulder being formed in the upper end having an anterior portion higher in level than a posterior portion.

The radiator 30 includes an upper tank 30A, the radiator core 30B, and a lower tank 30C. Specifically, the upper tank 30A is disposed at an upper end and receives cooling water that flows therein from the engine 9 via the radiator upper hose 50. The radiator core 30B includes a plurality of cooling water capillary tubes that are connected to a lower portion of the upper tank 30A and a plurality of heat radiating fins disposed on outer peripheries of the cooling water capillary tubes. The lower tank 30C is disposed at a lower end of the radiator core and allows cooling water cooled by the radiator core 30B to flow to the engine 9 via a radiator lower hose 51. Heat of the cooling water introduced to the cooling water capillary tubes of the radiator core 30B is radiated to cooling air drawn in by the cooling fan 10 through heat exchange performed by the radiator 30 between the cooling water and the cooling air.

A bracket (tank support member) 15 is bolted to an upper portion of the side surface plate 11A of the shroud 11. The bracket 15 protrudes substantially horizontally to the engine 9 side and fixedly supports the tank (reservoir tank (also known as an expansion tank)) 12 that stores the cooling water to be added (supplied) to the engine cooling system including the radiator 30 and the engine 9. The bracket 15 has an upper end disposed at a level higher than a lower end of the upper tank 30A. The tank 12 is supported by the bracket 15 such that a horizontal plane of the cooling water (lower limit water level (to be described later)) is formed above an upper end portion of the radiator 30. The tank 12 is disposed at a position adjacent to the shroud 11 on a side closer to the engine 9 than the inspection window cover 14B is.

Preferably, the bracket 15 is fixed to, in addition to the side surface plate 11A, at least one of structural members that constitute the machine room 25 in which the engine 9 is housed. For example, FIGS. 5 and 6 illustrate that the bracket 15 is supported from below by a support member 16 that protrudes to the rear while being fixed to the wall surface (front wall surface) 19 that is disposed anterior to the engine 9 while extending vertically. Fixedly supporting the tank 12 (including the cooling water) via a plurality of members as described above allows a load of the tank 12 borne by a single member to be reduced. As a result, the reduction in the load to be borne by the bracket 15, for example, allows strength of the shroud 11 (side surface plate 11A) to be reduced, so that cost of the shroud 11 can be reduced.

The tank 12 is disposed adjacent to the side surface plate 11A so as to avoid an upper portion of the opening 14A formed in the top surface plate 11B of the shroud 11. Specifically, the tank 12 is disposed such that, in a plan view, an outline of the tank 12 does not overlap an outline of the opening 14A. More specifically, the tank 12 is fixed by the bracket 15 such that the tank 12 has a leftmost end (the portion of the tank 12 closest to the radiator 30 in a plan view) disposed closer to the engine 9 side (right side) than a rightmost end (the portion in the opening 14A closest to the engine 9 in a plan view) of the opening 14A is.

The tank 12 has an opening formed in a bottom surface thereof. The opening serves as a water supply port. A makeup conduit (water supply conduit) 54 is attached to the opening. The makeup conduit 54 extends downwardly in a substantially vertical direction and is connected with the radiator lower hose 51. This arrangement allows the cooling water in the tank 12 to be supplied via the makeup conduit 54 to the radiator lower hose 51. The lower limit water level in the tank 12 is set to a height that is higher than an uppermost portion of an internal cavity of the upper tank 30A and higher than an uppermost portion of an internal cavity formed by a cooling water passage provided in the engine 9. In general, an upper end portion of the radiator 30 is higher than an upper end portion of the engine 9. Thus, the requirement can be satisfied by setting the lower limit water level at a level higher than the uppermost portion of the internal cavity of the radiator 30 (upper tank 30A).

It is noted that the makeup conduit 54 is required only to be connected with any point in a passage from the radiator core 30B to a water pump 91. The makeup conduit 54 may even be connected with the radiator lower tank 30C or the water pump 91.

The tank 12 has an opening for adding cooling water, formed in an upper surface thereof. A cap 12A is fitted in the opening. Tightening the cap 12A after the cooling water has been added hermetically seals the tank 12. An upper limit water level of the tank 12 has been established such that an air layer is ensured on a water layer in the tank 12. This air layer allows pressure in the cooling water passage to be steadily maintained. Preferably, the upper portion of the tank 12 or the cap 12A is provided with a pressure valve (not shown) that is capable of adjusting air pressure inside the tank.

The tank 12 has two openings. One of the two openings is connected with one end of an air bleeder conduit 52. Air bled from the radiator 30 is introduced to the air bleeder conduit 52. The other of the two openings is connected with one end of an air bleeder conduit 53. Air bled from the cooling water passage of the engine 9 is introduced to the air bleeder conduit 53. FIG. 3 exemplarily illustrates that the one ends of the air bleeder conduits 52 and 53 are connected to side surfaces of the tank 12. The air bleeder conduits 52 and 53 may nonetheless be connected to, for example, an upper surface or a lower surface of the tank 12.

The air bleeder conduit 52 has other end connected with an upper end portion of the upper tank 30A of the radiator 30. Any air present in the radiator 30 is guided with the cooling water into the tank 12 via the air bleeder conduit 52 and is subjected to gas liquid separation in the tank 12. As shown in FIG. 6, the above other end of the air bleeder conduit 52 on the radiator side in the present embodiment is introduced into the inside of the heat exchanger cover 35 by way of a hole 35A provided in the side surface plate 35B of the heat exchanger cover 35 on the engine 9 side and is connected with the upper tank 30A.

As described above, preferably, the air bleeder conduit 52 is connected with the upper end portion (highest level portion) of the upper tank 30A at which portion air particularly tends to accumulate. Operation of the water pump 91, however, causes the cooling water to flow into the tank 12 at all times due to a pressure difference in the cooling water passages, so that air can be bled of the radiator 30 at any other point than the highest level portion. Thus, the air bleeder conduit 52 can be connected with a side surface of the upper tank 30A.

The air bleeder conduit 53 has other end connected with a portion at which the cooling water passage in the engine 9 is routed at a level relatively higher than other portions of the cooling water passage. Thus, any air present in the cooling water passage inside the engine 9 is guided into the tank 12 via the air bleeder conduit 53.

As with the air bleeder conduit 52, the air bleeder conduit 53 is preferably connected with a highest level portion of the cooling water passage of the engine 9. The air bleeder conduit 53 may still be connected with a side surface of the cooling water passage. If the cooling water passage of the engine 9 is disposed so as to form a plurality of apexes (levels of the apexes may be different or identical), preferably, the air bleeder conduit 53 is connected with any one or each of the apexes or near the apexes. The engine cover 17H is configured to be rotatable about a rotational shaft (not shown) that is fixed to a position above the heat exchange unit 33 and that extends in the longitudinal direction. The engine cover 17H can thus be opened and closed. The engine cover 17H is held at a position higher than the upper end of the tank 12. It is noted that, in the present embodiment, the engine cover 17H has an upper surface extending substantially horizontally to have a uniform height; however, the engine cover 17H may have a height higher at a portion above the tank 12 than other portions. For example, incorporating such a cover shape (the shape of a cover 17Ha indicated by a dash-single-dot line in FIG. 5) in an arrangement in which the tank 12 is disposed at the front end in the machine room 25 allows a portion having a higher height to be disposed closer to the cab 7 (operator seat 71) with respect to the known arrangement. Thus, an operator sitting in the operator seat 71 can have a favorable rearward view as compared with the arrangement including the cover having a uniform height.

The engine cooling system included in the hydraulic excavator 1 according to the present embodiment is briefly described below with reference to FIG. 4. The arrow in FIG. 4 indicates the direction in which the cooling water (including air, if any, included in the cooling water) flows. It is to be understood that the arrow indicates the flow passage (including conduits and hoses) through which the cooling water flows, in addition to the direction in which the cooling water flows.

Figure 4:
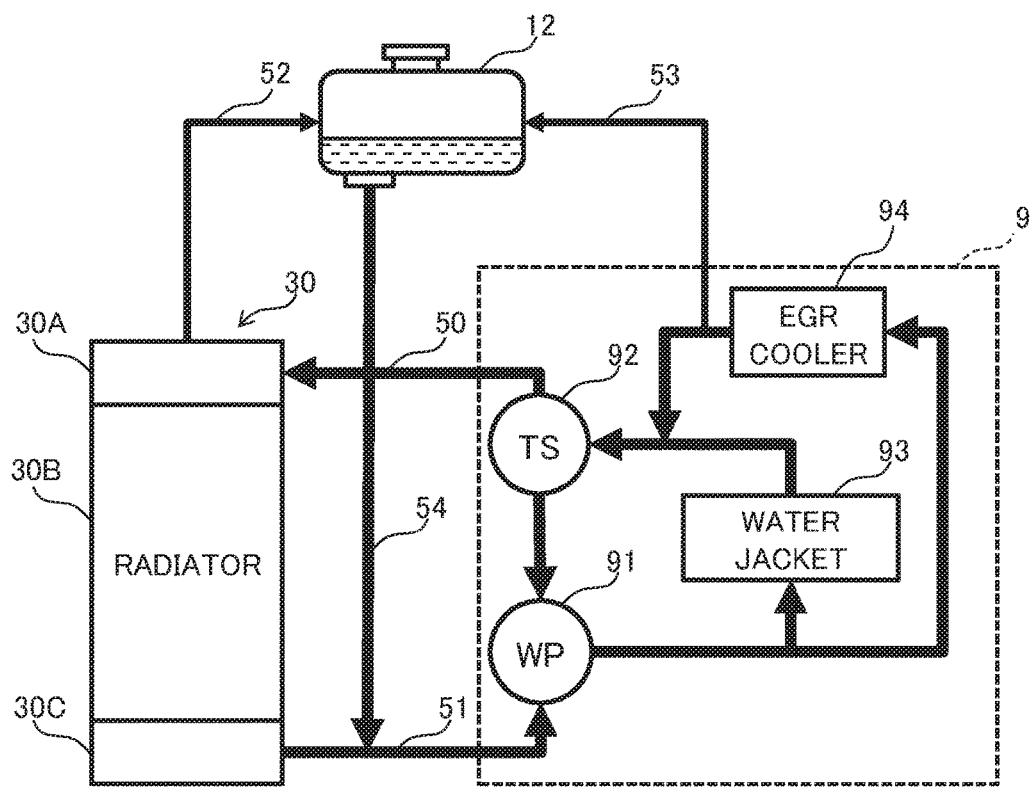
FIG. 4 is a configuration diagram schematically showing an engine cooling system included in the hydraulic excavator 1.

The engine cooling system shown in FIG. 4 includes the water pump 91, a thermostat 92, the water jacket 93, an exhaust gas recirculation (EGR) cooler 94, the radiator 30, and the tank 12.

The water pump 91 is driven by drive power of the engine 9, displacing and delivering cooling water from the thermostat 92 or the lower tank 30C to the water jacket 93 and the EGR cooler, thereby circulating the cooling water.

The water jacket 93 assumes a water passage provided around a cylinder (not shown) in the engine 9. The engine 9 is cooled as the cooling water delivered from the water pump 91 mainly flows through the water jacket 93 through heat exchange between the engine 9 and the cooling water.

The EGR cooler 94 cools engine exhaust through heat exchange between the engine exhaust and the cooling water. The exhaust cooled by the EGR cooler 94 is mixed with intake air and introduced again into the cylinder. The EGR cooler 94 and a cooling system associated therewith can be omitted.

The thermostat 92 is a valve unit that opens and closes the water passage according to a cooling water temperature. When the cooling water temperature is equal to or higher than a valve opening temperature, the thermostat 92 is open to thereby allow the cooling water to be introduced to the radiator 30. When the cooling water temperature is lower than the valve opening temperature, the thermostat 92 is closed and the cooling water circulates without being introduced to the radiator 30. In FIG. 4, the thermostat 92 is disposed in a passage through which the cooling water flows to the outside (upper tank 30A) of the engine 9 (the water jacket 93 and the EGR cooler 94). The thermostat 92 may still be disposed in a passage through which the cooling water enters the inside of the engine 9 (water pump 93) from the outside (lower tank 30C).

As described previously, the engine side end-portion of the air bleeder conduit 53 is connected with the cooling water passage configured inside the engine 9 and the cooling water in which air bubbles are trapped flows through this cooling water passage into the tank 12. In the example of FIG. 4, the air bleeder conduit 53 is connected with a passage that is connected with an outlet of the EGR cooler 94 because this passage is routed along a high site in the engine. Depending on the height of the cooling water passage, however, the air bleeder conduit 53 may be connected with a passage that leads from the water jacket 93 to the thermostat 92 or any other passage.

In the construction machine having the configurations as described above, the lower limit water level of the tank 12 is set at a position that is higher than a site at which the water level is the highest between the radiator 30 and the cooling water passage of the engine 9. Thus, even when air is produced in the radiator 30 or the cooling water passage of the engine 9, the air can be introduced to the tank 12 via the air bleeder conduits 52 and 53 and separated from the cooling water. Additionally, the tank 12 is disposed at a position adjacent to the side surface plate 11A of the shroud 11. This arrangement can achieve a short distance between the tank 12 and any of the radiator 30, the engine 9, and the radiator lower hose 51. This feature considerably facilitates disposition of the air bleeder conduits 52 and 53 and the makeup conduit 54. Furthermore, disposing the tank 12 as described above allows the makeup conduit 54 to be extended substantially vertically from the bottom surface of the tank 12 to thereby be connected with the radiator lower hose 51. This achieves an extremely smooth supply of cooling water from the tank 12 to the radiator lower hose 51 during addition of the cooling water. Additionally, the tank 12 or any other unit does not exist above the opening 14A in the top surface plate 11B of the shroud 11. This considerably facilitates cleaning of the radiator using a blower inserted through the opening 14A. Thus, in the present embodiment, the cooling water passages in the radiator 30 and the engine 9 can be bled of air without allowing the water adding performance for the engine cooling system and the cleaning performance of the radiator 30 to be impaired.

The operator places his or her feet on the top surface plates 17E and 17F when adding water to the tank 12 and cleaning the radiator 30. Disposing the opening 14A and the inspection window cover 14B in the upper step portion 11$b$1 as described previously enables the operator to readily gain access to the opening 14A and the inspection window cover 14B. Furthermore, the hinge 14C is disposed on the side of a rear end edge in the opening 14A in the present embodiment. Thus, the free end onto which the operator holds during opening and closing of the inspection window cover 14B can be disposed on the side of the top surface plates 17E and 17F. This facilitates the opening and closing of the inspection window cover 14B. Moreover, the disposition of the hinge 14C on the side of the rear end edge in the opening 14A results in the free end of the inspection window cover 14B rotated about the hinge 14C being positioned in the rear under a condition in which the opening 14A is left open, so that the inspection window cover 14B does not impede cleaning of the radiator 30.

Additionally, the height of the upper step portion 11$b$1 is preferably set to a position higher than upper ends of the radiator upper hose 50, the intercooler hose 56, and the air bleeder conduit 52 as in the present embodiment. This arrangement results in that in which, even when the inspection window cover 14B is fully open, the upper surface of the inspection window cover 14B contacts part of the upper step portion 11b1 or a fixing bracket such as a bolt protruding upwardly from the upper step portion 11b1, before contacting the radiator upper hose 50, the intercooler hose 56, or the air bleeder conduit 52. The radiator upper hose 50, the intercooler hose 56, and the air bleeder conduit 52 can thus be prevented from being damaged from otherwise possible contact with the upper surface of the inspection window cover 14B.

It is noted that, preferably, a support rod (prop) is disposed across the upper step portion 11b1 or a member therearound and the inspection window cover 14B during cleaning, regardless of a relation in height between the upper step portion 11b1 and the lower step portion 11b2, thereby to maintain a condition in which the inspection window cover 14B does not impede the cleaning and to ensure that the free end of the inspection window cover 14B can be readily held after the cleaning.

Additionally, in the present embodiment, the radiator upper hose 50, the intercooler hose 56, and the air bleeder conduit 52 protrude toward the engine side from the side surface plate 35B disposed on the engine 9 side (shroud side) of the heat exchanger cover 35. In addition to those, a hydraulic operating fluid conduit for supplying the oil cooler 31 with hydraulic operating fluid and other conduits may protrude. Alternatively, at least one of the abovementioned hydraulic operating fluid conduit, the radiator upper hose 50, the intercooler hose 56, and the air bleeder conduit 52 may protrude from the side surface plate 35B disposed on the engine side of the heat exchanger cover 35. The position from which these elements protrude may be different from what is illustrated in the drawings. The present invention can nonetheless be applied to any configuration and, in any configuration, contact of each conduit with the upper surface of the inspection window cover 14B can be avoided.

The top surface plate 11B in the present embodiment includes the upper step portion 11b1 and the lower step portion 11b2 that are configured to have different heights from each other in order to facilitate access to the inspection window cover 14B disposed on the upper step portion 11b1. The upper step portion 11b1 may nonetheless be lowered to a height equivalent to a height of the lower step portion 11b2 to thereby make the top surface plate 11B a horizontal plane. It should, however, be noted that, when the bracket 15 is fixed to the side surface plate 11A at a position higher than the height of the lower step portion 11b2 in order to hold the lower end of the tank 12 above the radiator 30 as in the present embodiment described above, the side surface plate 11A needs to be shaped as is even when the upper step portion 11b1 is lowered to the height of the lower step portion 11b2 (specifically, the side surface plate 11A needs to have an upper end that is shouldered to have a front end higher than a rear end).

Additionally, in the example described above, the side surface plate 11A is extended up to the upper surface of the heat exchanger cover 35 and the bracket 15 is fixed to the side surface plate 11A to thereby support the tank 12. If the top surface plate 11B and the upper end portion of the side surface plate 11A of the shroud 11 are lower than the upper surface of the heat exchanger cover 35, however, a possible alternative way is to fix a bracket that is taller than the one described above to the side surface plate 11A and to dispose the tank 12 at the position that satisfies the same conditions as above. Additionally, the side surface plate 11A (shroud 11) to which the bracket 15 is to be fixed is illustrative only and not limiting. The bracket 15 may be fixed to bulkheads provided substantially vertically at front and rear of the engine 9 and that define the machine room 25, or a similar member (structural member).

It should be noted that the present invention is not limited to the above-described embodiment and may include various modifications within the scope of the invention. For example, the entire detailed configuration of the embodiments described above is not always necessary to embody the present invention. Part of the configuration of the embodiment may be deleted. Part of the configuration of one embodiment may be added to or replaced with the configuration of another embodiment.

DESCRIPTION OF REFERENCE NUMERALS

1: Hydraulic excavator (construction machine)
2: Lower track structure
4: Upper swing structure
5: Work implement
6: Swing frame
7: Cab
9: Engine
10: Cooling fan
11: Shroud
11A: Side surface plate of the shroud (side surface on the engine side)
11B: Top surface plate of the shroud
11b1: Upper step portion
11b2: Lower step portion
11b3: Connecting portion
12: Reservoir tank (tank)
14A: Opening (shroud inspection window)
14B: Inspection window cover (cover)
14C: Hinge (hinge portion)
15: Bracket
16: Support member
17: Building cover
19: Front wall surface (structural member)
25: Machine room
30: Radiator
30A: Upper tank
30B: Radiator core
30C: Lower tank
32: Intercooler
33: Heat exchange unit
50: Radiator upper hose
51: Radiator lower hose
52: Air bleeder conduit (on the radiator side)
53: Air bleeder conduit (on the engine side)
54: Makeup conduit (water supply conduit)

The invention claimed is:
1. A construction machine comprising:
an engine;
a radiator that cools through heat exchange cooling water heated by the engine;
a cooling fan disposed between the radiator and the engine, the cooling fan sending air drawn in via the radiator to the engine;
a shroud disposed on an outer peripheral side of the cooling fan, the shroud forming a passage for air to be drawn in via the radiator;
a tank disposed superior to an upper end portion of the radiator, the tank storing cooling water to be supplied to the radiator and the engine; and
a cover disposed openably in an opening formed in an upper surface of the shroud, wherein the tank is disposed at a position adjacent to the shroud on a side closer to the engine than the cover is, the upper surface of the shroud includes an upper step portion to which the cover is connected via a hinge portion, a lower step portion disposed inferior to the upper step portion, and a connecting portion that connects the upper step portion with the lower step portion, and the construction machine further comprises:

an air bleeder conduit disposed between a height of the upper step portion and a height of the lower step portion, the air bleeder conduit used for bleeding air from the radiator.

2. The construction machine of claim 1 further comprising:

a water supply conduit is connected to a bottom surface of the tank and supplies cooling water to a cooling water passage that connects the radiator with the engine; and an air bleeder conduit is connected with the tank and is opened into the tank for introducing air that is bled from the radiator or the engine into the tank.

* * * * *